United States Patent [19]
Hilkert et al.

[11] 3,748,962
[45] July 31, 1973

[54] HOB SHIFTER

[75] Inventors: Thomas L. Hilkert; Goran E. Fransson; Richard E. Trenbeath, all of Rockford, Ill.

[73] Assignee: Barber-Colman Company, Rockford, Ill.

[22] Filed: Dec. 16, 1971

[21] Appl. No.: 208,752

[52] U.S. Cl. .................................................. 90/4
[51] Int. Cl. ............................................ B23f 5/22
[58] Field of Search .................... 90/4, 3; 51/95 GH

[56] References Cited
UNITED STATES PATENTS
2,484,856  10/1949  Purvin ........................................ 90/4
3,152,422  10/1964  Loxham .................................. 90/4 X Primary Examiner—Gil Weidenfeld
Attorney—Wolfe, Hubbard, Leydig, Voit & Ossann

[57] ABSTRACT

Signal pulses are produced and counted in response to axial shifting of the hob and are used to effect stopping of the hob when the latter has moved through a commanded distance.

6 Claims, 7 Drawing Figures

PATENTED JUL 31 1973

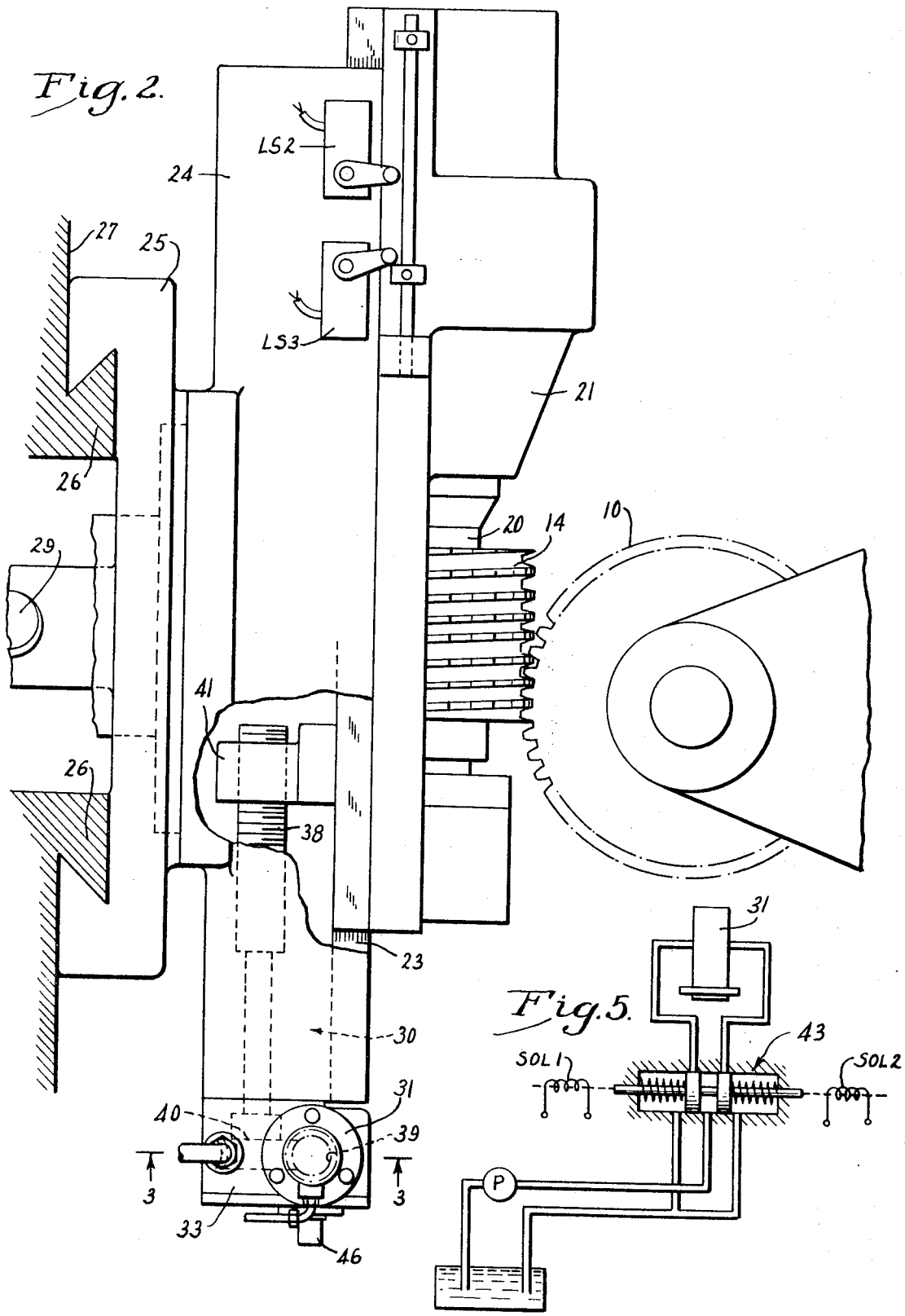

3,748,962

HOB SHIFTER

BACKGROUND OF THE INVENTION

This invention relates to a gear hobbing machine and, more particularly, to a hobbing machine in which the hob is periodically shifted in an axial direction and through a short distance relative to the work to bring a different portion of the hob into cutting position for the succeeding machine cycle. Hobbing machines with mechanism for shifting the hob axially are disclosed in U.S. Pat. Nos. 2,483,810; 2,484,856 and 2,906,178.

SUMMARY OF THE INVENTION

The general aim of the present invention is to provide a hobbing machine with a new and improved hob shifting mechanism which, when compared with prior shifting mechanisms, is more versatile and more widely adapted for use in conjunction with different types of hobbing machines and hobbing operations and which, at the same time, is capable of shifting the hob through a precise distance which may be changed over a wide range and in an extremely simple manner by the operator of the machine.

A further object of the invention is to achieve the foregoing through the provision of a hob shifting mechanism in which signal pulses are produced and counted in response to axial movement of the hob, shifting of the hob being terminated automatically when its actual displacement, as represented by the number of pulses produced, coincides exactly with a commanded displacement which the machine operator may easily and accurately set and adjust.

Another object is to signal the operator when a hob shift is in progress and has been completed and further to signal the operator when the hob has reached the terminal limit of its overall axial stroke. A correlated object is to automatically stop further shifting of the hob and disable the machine when the hob reaches the terminal limit of its stroke even though incremental displacement of the hob is still being commanded.

These and other objects and advantages of the invention will become more apparent from the following detailed description when taken in conjunction with the accompanying drawings.

BRIEF DESCRIPTION OF THE DRAWINGS

FIG. 2 is an enlarged fragmentary cross-section taken substantially along the line 2—2 of FIG. 1.

FIG. 5 is a schematic diagram of part of a fluid circuit for the shifting mechanism.

DETAILED DESCRIPTION OF THE PREFERRED EMBODIMENT

Figure 1:
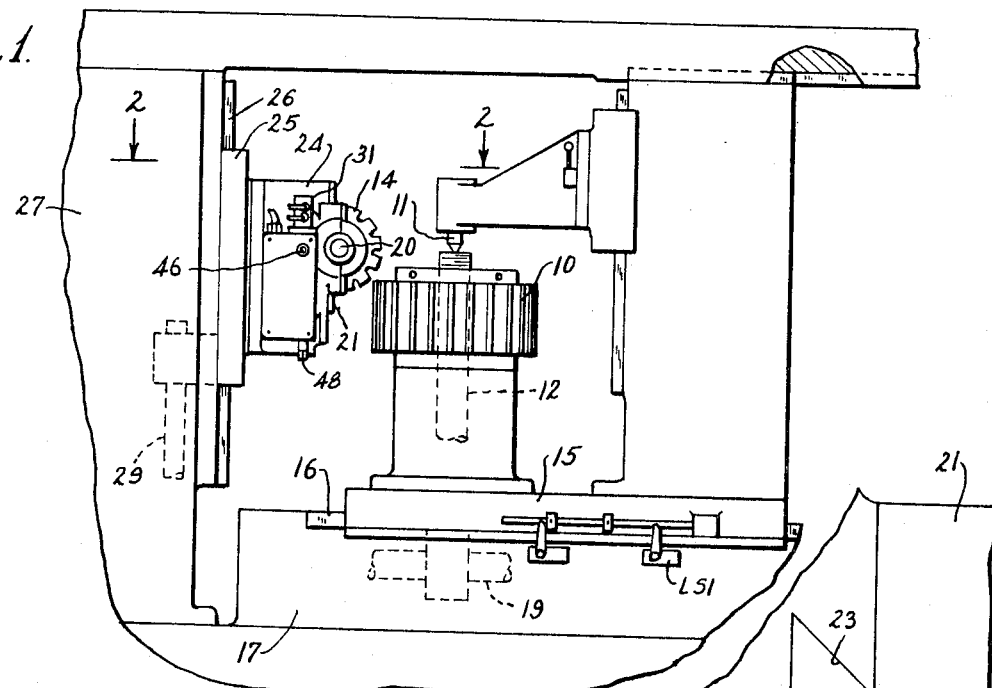
FIG. 1 is a fragmentary side elevational view of a new and improved hobbing machine embodying the novel features of the present invention.

While the present invention may be applied to hobbing machines of various constructions, it is shown in the drawings for purposes of illustration as embodied in a Barber-Colman Model 25-15 hobbing machine. In such a machine, the gear blank 10 (FIG. 1) to be hobbed is supported between a tailstock 11 and a work spindle 12 adapted to be power rotated about an upright axis in synchronism with the hob 14 and carried on a work slide 15 which is movable horizontally toward and away from the hob along ways 16 on a base 17. Advancement and retraction of the slide is effected by a power-driven reversible screw 19 housed within the base and operably connected to the slide.

Figure 3:
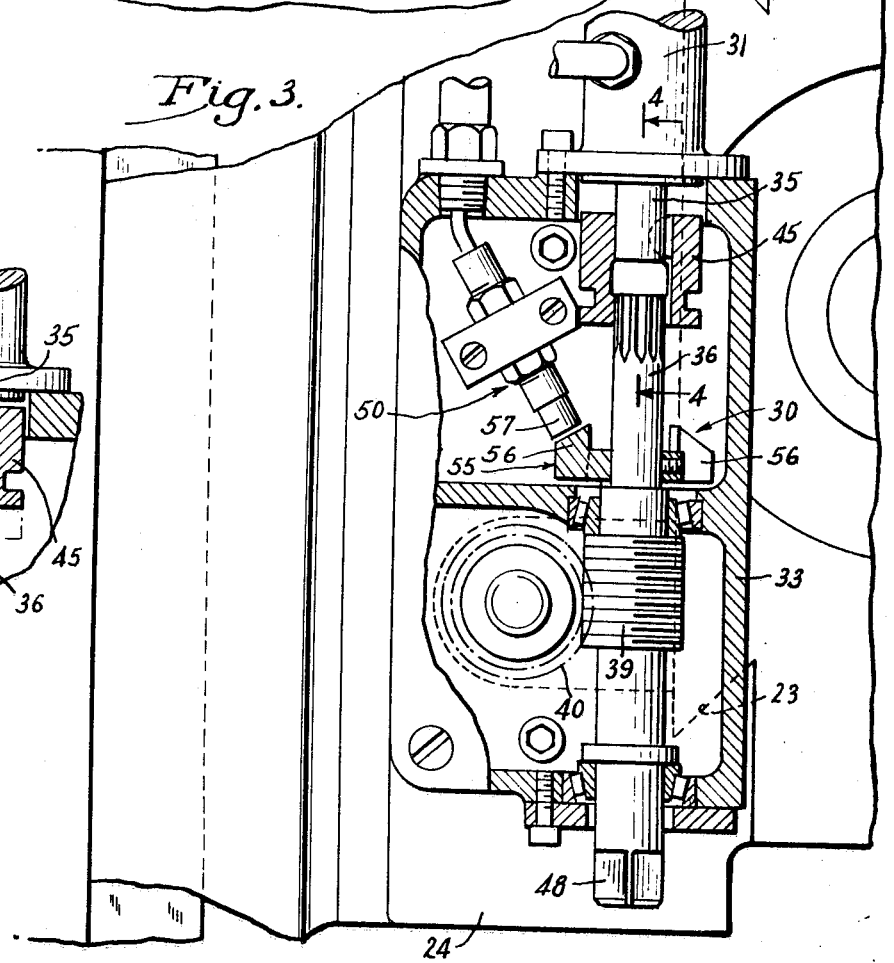
FIG. 3 is an enlarged fragmentary cross-section taken substantially along the line 3—3 of FIG. 2.

The hob 14 is secured to a horizontal spindle 20 journaled in bearings on a hob slide 21 which is guided in ways 23 (FIG. 3) paralleling the spindle and carried on a support formed by the hob swivel 24, the slide normally being locked against movement on the swivel by clamps (not shown). The hob swivel is mounted on a swivel slide 25 (FIG. 2) which moves on ways 26 formed on a column 27 and paralleling the axis of the gear blank 10. Feeding of the swivel slide 25 to produce radial movement of the hob is effected by a screw 29 (FIGS. 1 and 2) driven in opposite directions and at feed and return rates at proper times in the machine cycle.

In an exemplary hobbing cycle, the work slide 15 is advanced toward the hob 14 which then is fed radially and downwardly from the starting position shown in FIG. 1 to effect hobbing of the gear blank 10. After the hob has passed the blank and cut the gear, the work slide is retracted outwardly for unloading and the hob is returned upwardly at a rapid rate to its starting position preparatory to the next cycle.

During cutting engagement, the hob 14 and the gear blank 10 occupy the relative position shown in FIG. 2. In any one cutting cycle, only a portion of the effective length of the hob is in cutting engagement with the blank. By shifting the hob axially through a short predetermined distance after each cycle, the entire effective cutting length of the hob is brought into use and thus hob wear is uniformly distributed and hob life is substantially prolonged. Herein, axial shifting of the hob takes place while the work slide 15 is retracted and is effected by moving the hob slide 21 along the ways 23 on the swivel 24 after the slide has been unclamped from the swivel.

In accordance with the present invention, axial shifting of the hob 14 is produced by a novel shifting mechanism 30 and in a unique manner by (a) digitally signaling a numerical value representing a desired and adjustable displacement of the hob slide 21, (b) shifting the hob slide and producing a signal pulse each time the slide shifts through a predetermined incremental unit distance, (c) counting the signal pulses thus produced and (d) terminating shifting of the slide when the number of pulses counted coincides with the signaled numerical value so that the hob is stopped upon being moved the desired distance. As will become apparent subsequently, this arrangement results in shifting of the slide through a precisely accurate increment which may be changed or adjusted easily by the operator of the machine.

More specifically, the hob shifting mechanism 30 includes a reversible drive unit in the form of a rotary hydraulic motor 31 (FIG. 3) which is mounted on a housing 33 anchored to the outer end of the hob swivel 24. The drive shaft 35 of the motor projects into the housing and is coupled to an upright shaft 36 which, in turn, is connected to a horizontal lead screw 38 by a worm 39 and a worm wheel 40. The lead screw parallels the path of movement of the hob slide 21 as shown in FIG. 2 and is threaded into a nut 41 carried on the slide. When a solenoid SOL-1 (FIG. 5) is energized, a spring-centered four-way valve 43 is shifted from its neutral position to cause the motor 31 to be driven in a direction to shift the hob slide 21 outwardly or toward the operator of the machine. The valve is shifted oppositely upon energization of a solenoid SOL-2 and causes the motor to be driven in the reverse direction to shift the slide inwardly.

Figure 4:
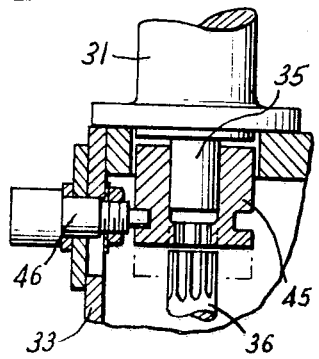
FIG. 4 is a fragmentary cross-section taken substantially along the line 4—4 of FIG. 3 but showing parts in moved positions.

In order to enable initial positioning of the slide 21 for set up purposes, the shaft 36 is connected to the drive shaft 35 of the motor 31 by a splined clutch sleeve 45 (FIG. 3) and may be uncoupled from the drive shaft by manually sliding the sleeve upwardly and completely off of the shaft 36 and onto the shaft 35 (see FIG. 4) with a pin 46 accessible from the outer side of the housing 33. After being uncoupled from the motor shaft 35, the shaft 36 may be turned manually by a crank (not shown) placed on the free end 48 (FIG. 3) of the shaft 36. The lead screw 38 thus is turned to shift the hob slide 21 to the proper position for initial set up of the hob 14.

Figure 6:
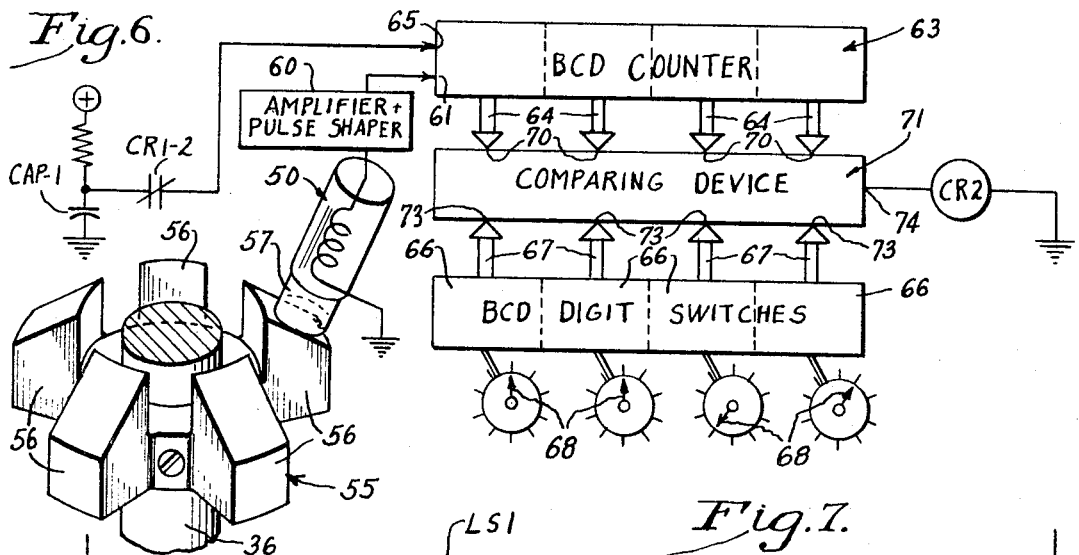
FIG. 6 is a block diagram showing part of an electrical control for the shifting mechanism.

In carrying out the invention, signal pulses are produced in response to shifting of the hob slide 21 by the motor 31. For this purpose, a proximity detector 50 (FIGS. 3 and 6) is positioned within the housing 33 adjacent a toothed wheel 55 which is fast on and rotatable with the shaft 36, the wheel herein being formed with five angularly spaced teeth 56 separated by notches which are somewhat wider than the teeth. Each time the motor 31 turns the shaft 36 sufficiently far to shift the hob slide 21 through a short predetermined unit increment (e.g., 0.001 inch), one of the teeth 56 rotates past the sensing head 57 of the proximity detector and causes the latter to produce an electrical output pulse. An exemplary proximity detector which may be used is a National Acme Co. Series EA 9700 inductive pick up detector. With a properly calibrated detector 50 and an accurately formed wheel 55, an output pulse is produced for each precisely equal increment of movement of the slide 21 and thus movement of the slide is very accurately monitored. In the present instance, a pulse is produced each time the slide is shifted through a unit increment of 0.001 inch although it will be appreciated that this may be varied by changing the drive ratio between the shaft 36 and the hob slide 21 or by changing the number of teeth 56 on the wheel 55.

The output pulses produced by the proximity detector 50 are routed to an amplifier and pulse shaper 60 (FIG. 6) and then are fed to the input terminals 61 of a count up counter 63 which herein comprises four decade stages connected in tandem, each such stage being capable of signaling in binary coded decimal notation on its output lines 64 any decimal value between 0 and 9 as 10 successive input pulses are supplied to the stage. Carry output pulses from each stage are suppled as input pulses to the decade stage of the next highest order. Such a counter is well known in the art and need not be treated in detail here. It will be sufficient to note that each pulse applied to the input terminals 61 causes the counter to count up and to increase by one unit the number held in and signaled by the counter. Merely by way of example, if the hob slide 21 has moved through 1.263 inches and the detector 50 thus has produced 1,263 pulses, the four decade stages will signal the decimal values "1", "2", "6" and "3" on their output lines 64. When a signal is applied to the reset terminals 65 of the counter, all stages thereof are reset and the counter signals the number 0.000.

Further in carrying out the invention, the machine operator may command shifting of the hob slide 21 through a predetermined distance which may be easily adjusted when necessary. To this end, provision is made of a bank of four digit switches 66 each of which is capable of signaling on its output lines 67 in binary coded decimal notation one digit of a four digit number representing the commanded displacement of the hob slide 21. By setting dials 68 associated with the switches, the operator may establish a desired displacement of the side 21 and the output lines 67 will digitally signal a numerical value representing the desired displacement. For example, if the operator sets the dials at 1, 2, 6 and 3, the output lines will signal the decimal values "1", "2", "6" and "3" to command movement of the slide 24 through 1.263 inches.

As pointed out above, shifting of the hob slide 21 is terminated when the actual displacement of the slide coincides with the commanded displacement. This is accomplished by comparing the actual displacement signaled in counter 63 with the commanded displacement signaled by the digit switches 66 and stopping the slide the instant the compared quantities become equal. More specifically, the output lines 64 of the counter are connected to one set of input terminals 70 of a comparing device 71 while the output lines 67 of the digit switches 66 are connected to a second set of input terminals 73. The comparing device may take different forms known to those skilled in the art and it functions to produce a signal on its output terminals 74 only when the two numbers respectively signaled on its input terminals are exactly equal. The signal thus is produced on the output terminals when the actual displacement of the slide 21 agrees with the commanded displacement and is used to stop shifting of the slide.

Now that the manner of commanding and detecting displacement of the hob slide 21 has been explained, it will be appropriate to describe a typical hob shifting cycle. During set up of the machine, the operator dials in on the digit switches 66 the commanded displacement desired during the shift and also places an in-off-out direction selector switch 76 (FIG. 7) in an appropriate position depending upon whether the slide 21 is to be shifted outwardly toward the operator or inwardly away from the operator. By way of example, it may be assumed herein that the slide is to be shifted outwardly and through a short incremental distance such as 0.013 inch. Thus, the operator would set the selector switch in the "out" position and would dial in the numbers 0.013 on the digit switches. In some instances, it may be desirable to shift the slide by a considerably greater amount to move the hob 14 a distance equal to the pitch between the hob teeth and, in such a case, a larger number of course would be dialed in on the digit switches.

Figure 7:
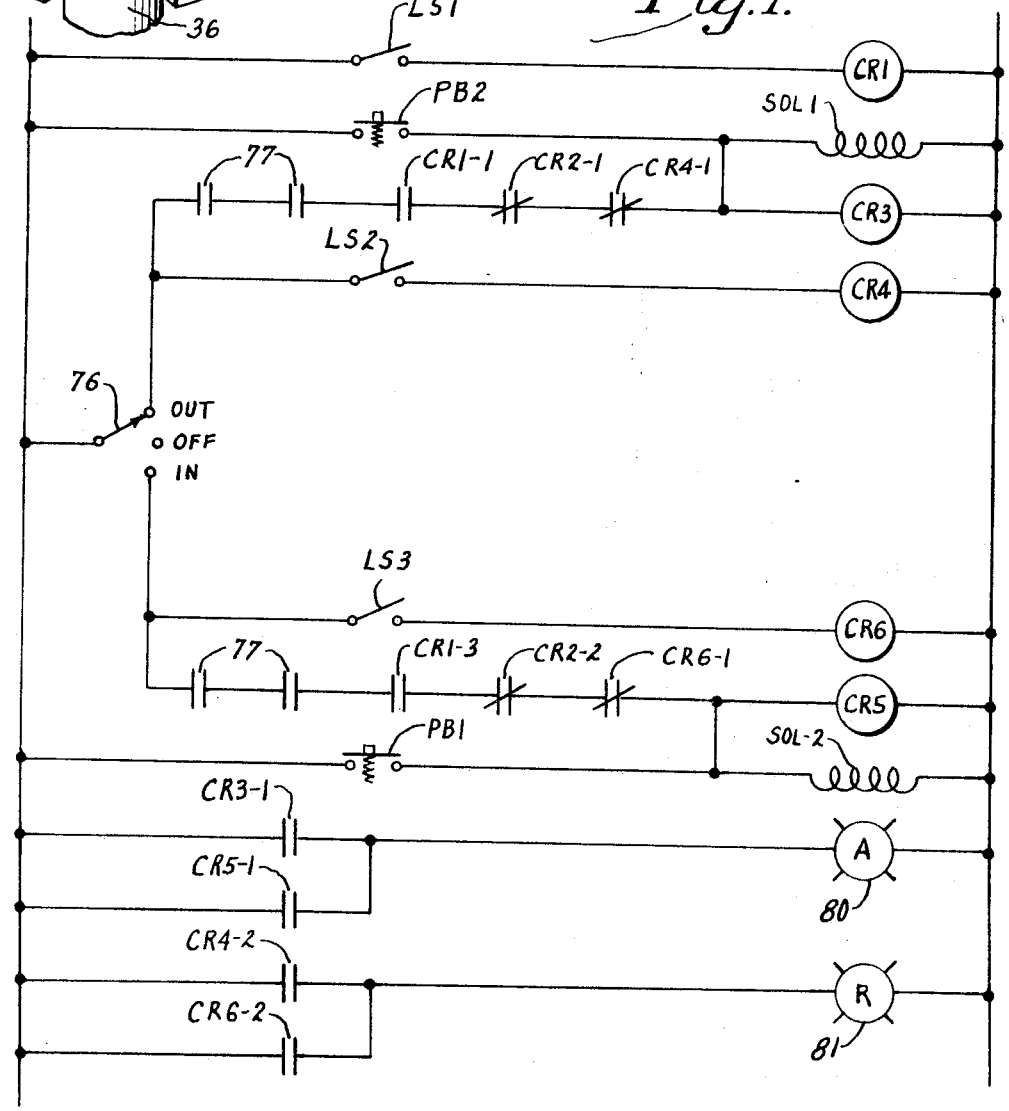
FIG. 7 is a schematic electrical circuit diagram of the control.

During hobbing of the gear blank 10, the work slide 15 is disposed in its advanced position and, in this position of the slide, a limit switch LS-1 is open and the circuit of FIG. 7 is conditioned as shown. Shifting of the hob 14 is initiated when the work slide 15 is retracted to close the limit switch LS-1. The shifting cannot occur, however, if certain conditions prevail. For example, shifting of the hob cannot occur if the machine is set up for tangential feed of the hob or if, at the time of retraction of the work slide, the machine is between the rough and finishing cut stages of a double cut hobbing cycle. If any "do not shift" condition prevails, one or more of a number of sets of interlocking relay contacts indicated collectively by the reference numeral 77 in FIG. 7 will be open when the work slide 15 is disposed in its retracted position and will prevent axial shifting of the hob. In addition to those contacts 77 which have been illustrated, several other interlocking relay contacts are included in the circuit of FIG. 7 and all are appropriately opened and closed by circuitry which is not necessary to describe in order to gain an understanding of the present invention.

If a hob shift is permissible, all of the contacts 77 will be closed when the work slide 15 reaches its retracted position and closes the limit switch LS-1 (FIG. 7). Closure of the limit switch picks up a relay CR1 to close relay contacts (not shown) and effect unclamping of the hob slide 21 from the hob swivel 24. In addition, energization of relay CR1 closes contacts CR1-1 (FIG. 7) to energize the solenoid SOL-1. The valve 43 thus is shifted to cause the motor 31 to drive the hob slide 21 in an outward direction and thereby shift the hob 14 outwardly. As the slide is shifted, the toothed wheel 55 on the shaft 36 causes the proximity detector 50 to produce pulses which are routed to the counter 63 to make the latter count in an upward direction.

Shifting of the hob slide 21 continues until the instant the decimal number signaled to the input terminals 70 of the comparing device 71 by the counter 63 equals the preset decimal number being signaled to the input terminals 73 of the comparing device by the digit switches 66, this occurring when the slide 21 has shifted through the commanded distance of 0.013 inch. When the numbers are equal, a signal appears on the output terminals 74 of the comparing device 71 and picks up a relay CR2 whose contacts CR2-1 open to de-energize the solenoid SOL-1 and center the valve 43. Rotation of the drive motor 31 thus is stopped so that movement of the slide 21 is terminated exactly when the slide has shifted through the commanded distance. With the axial shift completed, the work slide 15 then may be advanced for another cutting cycle.

As the work slide 15 advances from its retracted position, the limit switch LS-1 opens and drops out relay CR1 to cause re-clamping of the hob slide 21 to the swivel 24 and to open contacts CR1-1 and disable the solenoid SOL-1 until the work slide 15 is again retracted. At the same time, contacts CR1-2 (FIG. 6) are closed to cause a capacitor CAP-1 to discharge and apply a momentary pulse to the reset terminals 65 of the counter 63 thereby to reset the latter to zero preparatory to the next shifting cycle. When the counter resets, the number signaled to the input terminals 70 of the comparing device 71 by the counter no longer equals the number signaled to the input terminals 73 of the comparing device by the digit switches 66 and thus the signal on the output terminals 74 disappears to drop out the relay CR2 whose contacts CR2-1 thus close preparatory to the next shifting cycle. When the work slide 15 is again retracted and limit switch LS-1 is closed to pick up relay CR1, contacts CR1-2 (FIG. 6) open to enable charging of the capacitor CAP-1 preparatory to applying the next pulse to the reset terminals 65 of the counter 63.

Advantageously, a visual signal is given to the operator during the time the hob 14 is shifting. When the contacts CR1-1 are closed to initiate the shift, a relay CR3 (FIG. 7) is picked up and closes its contacts CR3-1 to energize an amber indicator light 80 so that the operator can determine that a shift is in progress. When the shift has terminated and contacts CR2-1 open, relay CR3 drops out and opens its contacts CR3-1 thereby to turn off the indicator light and inform the operator that the shift has been completed.

Means are provided for interrupting incremental shifting of the hob 14 after the hob has shifted outwardly through several incremental cycles and the full length of the hob has been brought into operative position with the gear blank 10 as shown in phantom in FIG. 2. Herein, these means comprise a limit switch LS-2 (FIGS. 2 and 7) mounted on the hob swivel 24 and positioned to be closed by the hob slide 21 when the latter reaches the terminal limit of the axial stroke of the hob. Closure of the limit switch LS-2 picks up a relay CR4 (FIG. 7) whose contacts CR4-1 open and de-energize the solenoid SOL-1 to stop further outward shifting of the slide 21 even though contacts CR1-1 and CR2-1 are closed and an incremental shift has been started. The incremental shift thus will not be completed. To warn the operator that the hob has reached the limit of its stroke and that an incremental shift has been interrupted, a red indicating light 81 (FIG. 7) is energized by closure of relay contacts CR4-2 when relay CR4 is picked up due to closure of the limit switch LS-2. Moreover, energization of the relay CR4 triggers additional contacts (not shown) in the control circuit of the overall machine to prevent further automatic cycling of the machine until the hob slide 21 is either returned inwardly or is conditioned to return inwardly. Inward return of the slide may be effected by manually depressing and closing a push button switch PB-1 (FIG. 7) to energize the solenoid SOL-2 and cause driving of the motor 31 in a direction to move the slide inwardly to its starting position. Alternatively, the operator may move the selector switch 76 to the "in" position and, after taking other appropriate steps to condition the machine for inward shifting of the hob, may incrementally shift the hob inwardly as an incident to further cycling of the machine.

The circuitry (see FIG. 7) which connects with the "in" position of the selector switch 76 is identical to and functions in the same manner as that which connects with the "out" position of the switch and need not be described in detail. It will suffice here to say that relays CR5 and CR6 correspond to relays CR3 and CR4, respectively; relay contacts CR1-3, CR2-2, CR5-1, CR6-1 and CR6-2 correspond to relay contacts CR1-1, CR2-1, CR3-1, CR4-1 and CR4-2, respectively; and the limit switch LS-3 corresponds to limit switch LS-2 but is closed when the hob slide 21 reaches the terminal limit of its inward travel. Also, the push button switch PB-2 corresponds to push button switch PB-1 but is used to shift the hob slide outwardly under manual control.

From the foregoing, it will be apparent that the present invention brings to the art a new and improved hobbing machine in which axial shifting of the hob 14 is carried out with precise accuracy and in which the extent of displacement may be adjusted over a wide range simply by changing the setting of the dials 68 and without need of making mechanical adjustments through the use of change gears or the like. As a result and because the mechanical construction of the hob shifting mechanism 30 is extremely simple, the mechanism may be used in several different models of hobbing machines. Since the shifting is controlled electrically rather than mechanically, special shifting cycles for different types of hobbing operations can be achieved with appropriate modifications in the control circuitry. The shifting mechanism thus is quite versatile in itself and enhances the versatility of the overall machine.

We claim as our invention:

1. In a hobbing machine, the combination of, a support, a rotatable hob, a slide mounting said hob on said support for axial shifting, drive mechanism for moving said slide to shift said hob axially, first means for digitally signaling a first numerical value representing a desired displacement of said slide, second means for enabling said drive mechanism to initiate movement of said slide, third means for producing a signal pulse in response to movement of the slide through a predetermined incremental unit distance, fourth means for counting said pulses and digitally signaling a second numerical value which changes in proportion to the number of pulses produced and in proportion to the actual distance traveled by said slide, and fifth means responsive to said first and fourth means for disabling said drive mechanism and terminating movement of said slide when said actual distance becomes equal to said desired displacement.

2. A hobbing machine as defined in claim 1 in which said second numerical value increases in proportion to the number of pulses produced, said fifth means terminating movement of said slide when said second numerical value coincides with said first numerical value.

3. A hobbing machine as defined in claim 1 in which said drive mechanism comprises a rotatable shaft operably connected to said slide to shift the latter, said first means comprising a toothed wheel fast on and rotatable with said shaft, and a proximity detector positioned adjacent said wheel and operable to produce signal pulses as an incident to rotation of said wheel.

4. A hobbing machine as defined in claim 1 further including means responsive to said second and fifth means for producing a visula signal which begins at the time movement of said slide is initiated and which ends at the time movement of said slide is terminated.

5. A hobbing machine as defined in claim 1 further including means for disabling said drive mechanism and stopping said slide when the latter reaches a predetermined position on said support regardless of whether said actual distance has become equal to said desired displacement when the slide reaches such position.

6. A hobbing machine as defined in claim 5 further including means responsive to said last-mentioned means for disabling automatic cycling of the machine when said slide reaches said predetermined position.

* * * * *